United States Patent
Min et al.

(10) Patent No.: US 7,466,644 B2
(45) Date of Patent: Dec. 16, 2008

(54) HIGH-SPEED, HIGH-DENSITY DATA STORAGE APPARATUS EMPLOYING TIME-DIVISION-MULTIPLEXING TECHNIQUE, AND DATA RECORDING METHOD AND DATA REPRODUCING METHOD BOTH USING THE APPARATUS

(75) Inventors: Dong-ki Min, Seoul (KR); Hyun-jung Shin, Kyungki-do (KR)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 949 days.

(21) Appl. No.: 10/406,440

(22) Filed: Apr. 4, 2003

(65) Prior Publication Data

US 2003/0210640 A1    Nov. 13, 2003

(30) Foreign Application Priority Data

May 10, 2002    (KR)    ................................ 2002-25909

(51) Int. Cl.
G11B 9/00    (2006.01)

(52) U.S. Cl. .................................... 369/126

(58) Field of Classification Search ............. None
See application file for complete search history.

(56) References Cited

U.S. PATENT DOCUMENTS

| | | | | |
|---|---|---|---|---|
| 5,182,521 A | * | 1/1993 | Chang et al. | 327/553 |
| 5,216,631 A | * | 6/1993 | Sliwa, Jr. | 365/174 |
| 5,329,122 A | * | 7/1994 | Sakai et al. | 250/306 |
| 5,373,494 A | * | 12/1994 | Kawagishi et al. | 369/126 |

(Continued)

FOREIGN PATENT DOCUMENTS

JP    4-90150 A    3/1992

(Continued)

OTHER PUBLICATIONS

Notice to Submit Response issued by the Korean Patent Office on Nov. 30, 2004 in corresponding application.

(Continued)

*Primary Examiner*—Joseph H Feild
*Assistant Examiner*—Christopher R Lamb
(74) *Attorney, Agent, or Firm*—Buchanan Ingersoll & Rooney PC

(57) ABSTRACT

A data storage apparatus adopting a time division multiplexing technique, and a data recording method and a data reproduction method both using the apparatus, are provided. In the data storage apparatus, a recording medium stores data, and a stage supports the recording medium. A scanner drives the stage, and a cantilever array composed of a plurality of cantilevers record data to and reproducing data from the recording medium in a data detecting sequence. A controller detects data by applying a scanner driving signal to the scanner and applying a voltage signal for data recording or a voltage modulation signal for data reproduction to the plurality of cantilevers. Controlling the plurality of cantilevers using a single controller enables a data storage apparatus to be driven with low power and reduced in its circuit size. Installation of a pseudo-differential capacitor ensures high sensitivity. Since data is recorded and reproduced while the scanner moves at a uniform speed, and the data are recorded in a specific pattern, this leads to fast data recording and reproduction.

12 Claims, 10 Drawing Sheets

U.S. PATENT DOCUMENTS 5,835,477 A * 11/1998 Binnig et al. ............... 369/126
6,072,764 A    6/2000 Shido et al. ................ 369/126

FOREIGN PATENT DOCUMENTS

| JP | 6-20311 A | 1/1994 |
| JP | 8-329538 A | 12/1996 |
| JP | 10-312592 | 11/1998 |
| JP | 12-137932 | 5/2000 |

OTHER PUBLICATIONS

English-language Abstract of Official Action (Notice to Submit Response) issued by the Japanese Patent Office on Nov. 1, 2006 in the corresponding Japanese patent application.

Korean Office Action dated May 25, 2005, and English Translation.

* cited by examiner (a)

(b)

HIGH-SPEED, HIGH-DENSITY DATA STORAGE APPARATUS EMPLOYING TIME-DIVISION-MULTIPLEXING TECHNIQUE, AND DATA RECORDING METHOD AND DATA REPRODUCING METHOD BOTH USING THE APPARATUS

BACKGROUND OF THE INVENTION

This application claims the priority of Korean Patent Application No. 2002-25909, filed May 10, 2002, in the Korean Intellectual Property Office, the disclosure of which is incorporated herein in its entirety by reference.

1. Field of the Invention

The present invention relates to a high-density data storage apparatus using a scanning probe microscopy (SPM) technique, a data recording method, and a data reproducing method, and more particularly, to a data storage apparatus capable of rapidly recording and reproducing data with a high density using a capacitance detector, and a data recording method and a data reproducing method both using the data storage apparatus.

2. Description of the Related Art

A high-speed, high-density data storage apparatus using an SPM technique is composed of a cantilever array of cantilevers each having a tip to record or reproduce data, a recording medium for storing data, a stage for driving the recording medium in the directions of X and Y axes, and a controller.

Data is reproduced from the recording medium by detecting a change in the properties of cantilevers, which is generated due to the interaction between the recording medium and the tips. As the speed of data reproduction is restricted by the frequency characteristics of a cantilever, the detection of a plurality of data using a single cantilever affects the speed of data reproduction. In order to reduce this problem, there has been proposed a method of recording data to and reproducing data from a recording medium using a plurality of cantilevers.

Type of data storage techniques using a probe includes a capacitance detection technique for detecting a change in the capacitance, and a scanning capacitance microscopy (SCM) technique for detecting a change in the resonance frequency or oscillating width using an oscillator.

A brief conceptual diagram of a conventional cantilever using the capacitance detection technique is shown in FIG. 1. Referring to FIG. 1A, a cantilever 2, whose one end is fixed to a fixed end, is connected to an electrode 3 to form a capacitor with the electrode 3. A tip 4 is attached to the other end of the cantilever 2, which is free. While the cantilever 2 moves over the surface of the recording medium, the end of the cantilever 2 that has the tip 4 moves in the direction perpendicular to the surface of the recording medium, that is, in the Z-axis direction, due to the interaction between the tip 4 and the surface of the recording medium. At this time, the capacitance of the capacitor formed by the cantilever 2 and the electrode 3 changes.

An equivalent circuit of the conventional cantilever adopting the capacitance detection technique of FIG. 1A is shown in FIG. 1B. In such a conventional data storage apparatus adopting the capacitance detection technique, the detected current induced by the capacitance change is proportional to the sum of a nominal capacitance value and a variation in the capacitance. This makes it difficult to improve the amplification and sensitivity of a signal.

FIGS. 2A and 2B are a conceptual diagram and its equivalent circuit, respectively, of a conventional differential cantilever configured such as to compensate for the defects of the capacitance detection technique adopted by the cantilever device shown in FIGS. 1A and 1B in order to detect only the variation in capacitance.

Referring to FIG. 2A, the center of a conventional differential cantilever 8 with a tip 11 is supported by a supporter 12, a cantilever portion on the left side of the supporter 12 forms a capacitor together with an electrode 9, and a cantilever portion on the right side of the supporter 12 forms a capacitor together with an electrode 10. As the conventional differential cantilever 8 is supported at its center by the supporter 12, it records and reproduces data while one end having the tip 11 descends by lifting the other end.

The differential cantilever 8 is better than the existing cantilever 2 in terms of the linearity and the size and sensitivity of a detection signal. However, the differential cantilever 8 requires a great amount of driving force because the driving displacement increases due to the increased width of the supporter 12 and the length of the cantilever 8 twice as long as the existing cantilever 2. In order to overcome the drawback, a conventional data storage apparatus adopts an array of the plurality of cantilevers 8 and records and reproduces data by moving a recording medium in directions X and Y.

FIGS. 3A and 3B illustrate a method of recording and reproducing data using a plurality of conventional cantilevers to each of which a sensor is connected. Referring to FIG. 3A, sensors S1, S2, S3 and S4 are connected to cantilevers 11, 13, 15 and 17, respectively, to individually apply a data recording signal to the cantilevers and individually detect a data reproduction signal from them.

As shown in FIG. 3B, each of the sensors detects one data detection signal for each data area. In such a case where a plurality of cantilevers are controlled by a plurality of sensors, the recording and reproduction speeds are improved in proportion to the number of cantilevers. On the other hand, a detection and recording circuit for the cantilevers occupies a large area, and power consumption increases.

SUMMARY OF THE INVENTION

To solve the above-described problems, it is an object of the present invention to provide a data storage apparatus adopting an improved time-division-multiplexing (TDM) technique in which a high data transmission rate and easy control, which are guaranteed by driving a plurality of cantilevers using a plurality of control circuits, are combined with the merits of a general TDM technique that a small amount of driving power is required and that a data storage apparatus is compact, and also provide a data recording method and a data reproducing method both using the improved apparatus.

To achieve the above object, the present invention provides a data storage apparatus including: a recording medium for storing data; a stage for supporting the recording medium; a scanner for driving the stage; a cantilever array of a plurality of cantilevers for recording data to and reproducing data from the recording medium in a data detecting sequence; and a controller for applying a scanner driving signal to the scanner and applying a voltage signal for data recording or a voltage modulation signal for data reproduction to the plurality of cantilevers, in order to detect data.

Preferably, the data storage apparatus further includes a reference capacitor for transmitting a reference voltage signal to the controller.

The reference capacitor is formed by a no-tip cantilever and an electrode.

The controller includes a scanner driving unit, a signal transmission unit, and a signal receiving unit. The scanner driving unit applies the scanner driving signal to the scanner. The signal transmission unit applies the voltage signal for data recording or the voltage modulation signal for data reproduction to the cantilevers. The signal receiving unit receives a current signal differenced from the current signals from the capacitor formed by the cantilever subject to the interaction with the recording medium and the reference capacitor.

Preferably, the data storage apparatus further includes a plurality of switches installed between the plurality of cantilevers and the signal transmission unit so that the voltage signal or voltage modulation signal received from the signal transmission unit is applied to only some cantilevers.

The controller may further include a switch control unit for applying a switch driving signal to the switches.

The scanner driving unit applies a driving signal for stopping the movement of the scanner while the signal transmission unit applies the voltage signal or voltage modulation signal to the cantilevers. The switch control unit applies a driving signal for selectively opening or closing all of the switches while the signal transmission unit applies the voltage signal or voltage modulation signal to the cantilevers.

When the scanner driving unit applies a driving signal for moving the scanner at a uniform speed, the switch control unit applies a driving signal for sequentially opening or closing the switches.

It is preferable that the data storage apparatus further includes a data output unit for outputting reproduced data obtained from the current signal of the controller.

To achieve the above object, the present invention also provides a data recording method performed in a data storage apparatus including a recording medium, a stage for supporting the recording medium, a scanner for driving the stage, a cantilever array of a plurality of cantilevers for recording data to and reproducing data from the recording medium, a controller for applying a scanner driving signal to the scanner and applying a voltage signal for data recording to the plurality of cantilevers, and switches for connecting the plurality of cantilevers to the controller. In the data recording method, first, the recording medium is divided into an equal number of data areas to the number of cantilevers so that a data area is allocated to a cantilever. Next, the scanner is moved to some desired data areas. Thereafter, the scanner is stopped, and the voltage signal for data recording is applied to the cantilevers. Then, data is recorded by selectively and simultaneously opening or closing the switches connected to some cantilevers allocated to the desired data areas of the recording medium in a data detection sequence.

To achieve the above object, the present invention also provides a data recording method performed in a data storage apparatus including a recording medium, a stage for supporting the recording medium, a scanner for driving the stage, a cantilever array of a plurality of cantilevers for recording data to and reproducing data from the recording medium, a controller for applying a scanner driving signal to the scanner and applying a voltage signal for data recording to the plurality of cantilevers, and switches for connecting the plurality of cantilevers to the controller. In the data recording method, first, the recording medium is divided into an equal number of data areas to the number of cantilevers so that a data area is allocated to a cantilever. Then, the scanner moves at a uniform speed. Next, the voltage signal for data recording is applied to the cantilevers. Thereafter, data is recorded by sequentially opening or closing the switches connected to some cantilevers allocated to some desired data areas of the recording medium.

When the number of cantilevers is N×M (N is rows and M is columns in the array) and the interval between data is L, the cantilevers record data at intervals of ΔL satisfying Equation 1:

$$\Delta L = \frac{L}{NM} \qquad (1)$$

To achieve the above object, the present invention also provides a data reproduction method performed in a data storage apparatus including a recording medium, a stage for supporting the recording medium, a scanner for driving the stage, a cantilever array of a plurality of cantilevers for recording data to and reproducing data from the recording medium, a controller for applying a scanner driving signal to the scanner and applying a voltage modulation signal for data reproduction to the plurality of cantilevers, and a reference capacitor for outputting a reference voltage signal to the controller. In the data reproduction method, first, the recording medium is divided into a number of equal data areas corresponding to the number of cantilevers so that a data area is allocated to a cantilever. Then, the scanner is moved to the predetermined data area. Thereafter, the scanner stops, and the voltage modulation signal for data reproduction is sequentially applied to the cantilevers. Next, data is reproduced by differencing the current signal from the capacitor formed by the cantilever subject to the interaction with the recording medium and the current signal from the reference capacitor.

To achieve the above object, the present invention also provides a data reproduction method performed in a data storage apparatus including a recording medium, a stage for supporting the recording medium, a scanner for driving the stage, a cantilever array of a plurality of cantilevers for recording data to and reproducing data from the recording medium, a controller for applying a scanner driving signal to the scanner and applying a voltage modulation signal for data reproduction to the plurality of cantilevers, and a reference capacitor for outputting a reference voltage signal to the controller. In the data reproduction method, first, the recording medium is divided into a number of equal data areas corresponding to the number of cantilevers so that a data area is allocated to a cantilever. Next, the scanner moves at a uniform speed. Thereafter, the voltage modulation signal for data reproduction is sequentially applied to the cantilevers. Then, data is reproduced by differencing the current signal from the capacitor formed by the cantilever subject to the interaction with the recording medium and the current signal from the reference capacitor.

When the number of cantilevers is N×M, the interval between data is L, and the speed of the scanner is V, the cantilevers reproduce data at intervals of Δt satisfying Equation 2:

$$\Delta t = \frac{L}{VNM} \qquad (2)$$

To achieve the above object, the present invention also provides a data reproduction method performed in a data storage apparatus including a recording medium, a stage for supporting the recording medium, a scanner for driving the stage, a cantilever array of a plurality of cantilevers for recording data to and reproducing data from the recording medium, a controller for applying a scanner driving signal to the scanner and applying a voltage modulation signal for data reproduction to the plurality of cantilevers, and a plurality of switches for connecting the plurality of cantilevers to the controller. In the data reproduction method, first, the recording medium is divided into a number of equal data areas corresponding to the number of cantilevers so that a data area is allocated to a cantilever. Next, the scanner moves at a uniform speed. Then, some switches connected to some cantilevers in the middle of the effective field of each of the data areas open or close, and a current signal generated by the interaction of the cantilevers with the recording medium is detected, so that data is reproduced.

When the speed of the scanner is V and the interval between data is $\Delta L$, the cantilevers reproduce data at time intervals of $\Delta t$ satisfying Equation 3:

$$\Delta t = \frac{\Delta L}{V} \qquad (3)$$

In a data storage apparatus adopting a new TDM technique that overcomes the drawbacks of a conventional TDM technique, and a data recording method and a data reproduction method both performed in the improved apparatus, data is recorded and reproduced while a stage moving at a uniform speed. Thus, the data transmission rate can increase, and data can be reproduced using a small number of circuits with low power.

BRIEF DESCRIPTION OF THE DRAWINGS

The above object and advantages of the present invention will become more apparent by describing in detail preferred embodiments thereof with reference to the attached drawings in which:

FIG. 4C(b) is a graph briefly showing voltage modulation signals for data reproduction, which are applied to the cantilevers of the data storage apparatus of FIG. 4A;

DETAILED DESCRIPTION OF THE INVENTION

The present invention provides data recording and reproduction to which a new time-division-multiplexing technique is applied, and also provides a new data recording method and a new data reproduction method both adopting a pseudo-differential capacitor. The data recording and reproduction will now be described in detail according to three embodiments depending on the driving speed of a scanner for driving a stage and the use or non-use of a pseudo-differential capacitor.

In data storage apparatuses according to the first through the third embodiments of the present invention, a plurality of cantilevers are connected to a sensor, that is, to a controller. The data storage apparatuses, data recording methods, and data reproduction methods according to the first through the third embodiments of the present invention can be applied to any data such as charge amounts, electric polarization, magnetic polarization, geometrical shapes, phase changes, etc.

In the First Embodiment

In the data storage apparatus according to the first embodiment of the present invention, data is recorded and reproduced by repeating the moving and stopping operations of a scanner, and data is detected by a pseudo-differential capacitor. The data storage apparatus according to the first embodiment of the present invention is shown in FIG. 4A.

Figure 1A:
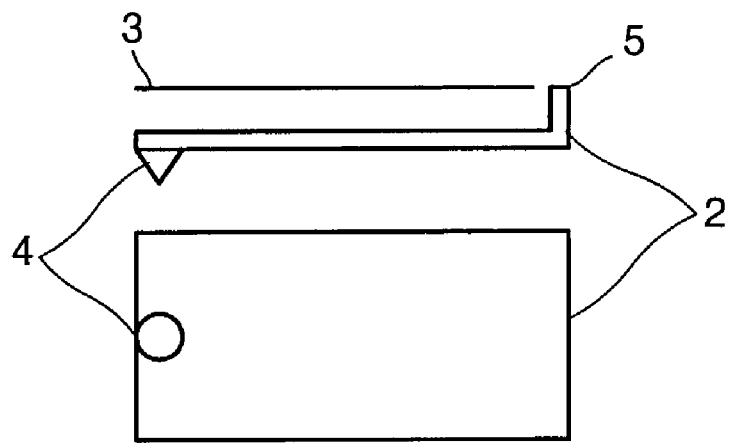
FIG. 1A is a brief conceptual diagram of a conventional data storage apparatus adopting a capacitance detection technique.
Figure 1B:
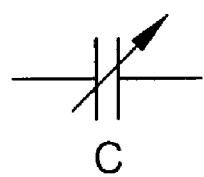
FIG. 1B is a circuit diagram briefly illustrating an equivalent circuit of FIG. 1A.
Figure 2A:
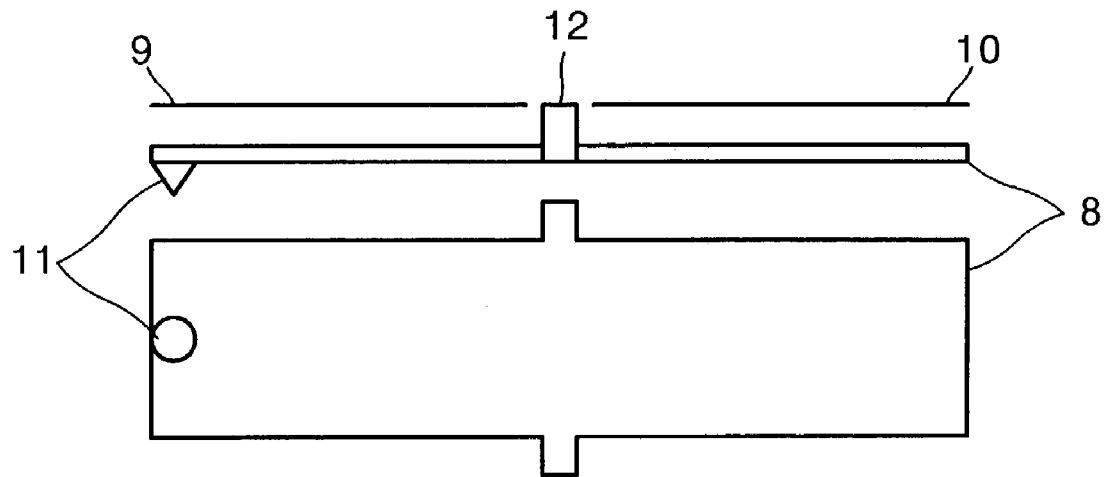
FIG. 2A is a brief conceptual diagram of a conventional data storage apparatus adopting a capacitance detection technique using a differential capacitor.
Figure 2B:
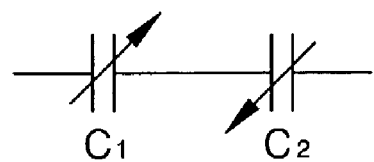
FIG. 2B is a circuit diagram briefly illustrating an equivalent circuit of FIG. 2A.
Figure 3A:
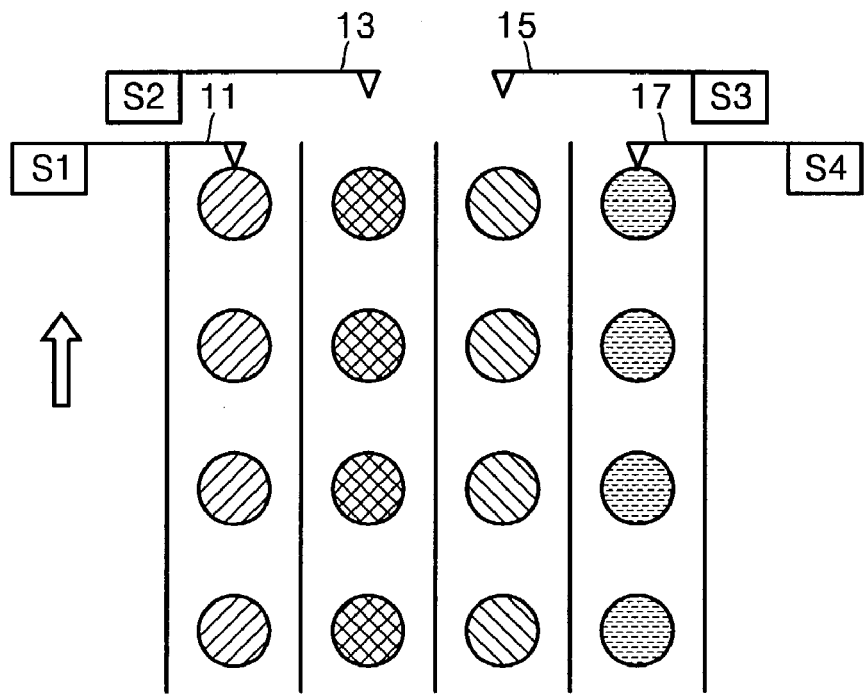
FIG. 3A is a brief conceptual diagram of a conventional data storage apparatus in which a plurality of sensors are connected to a plurality of cantilevers.
Figure 3B:
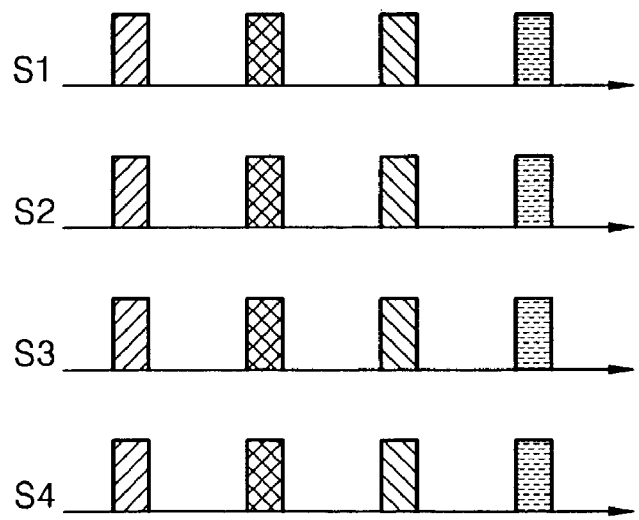
FIG. 3B is a graph briefly illustrating data recording signals that are output by each of the sensors of the data storage apparatus of FIG. 3A.
Figure 4A:
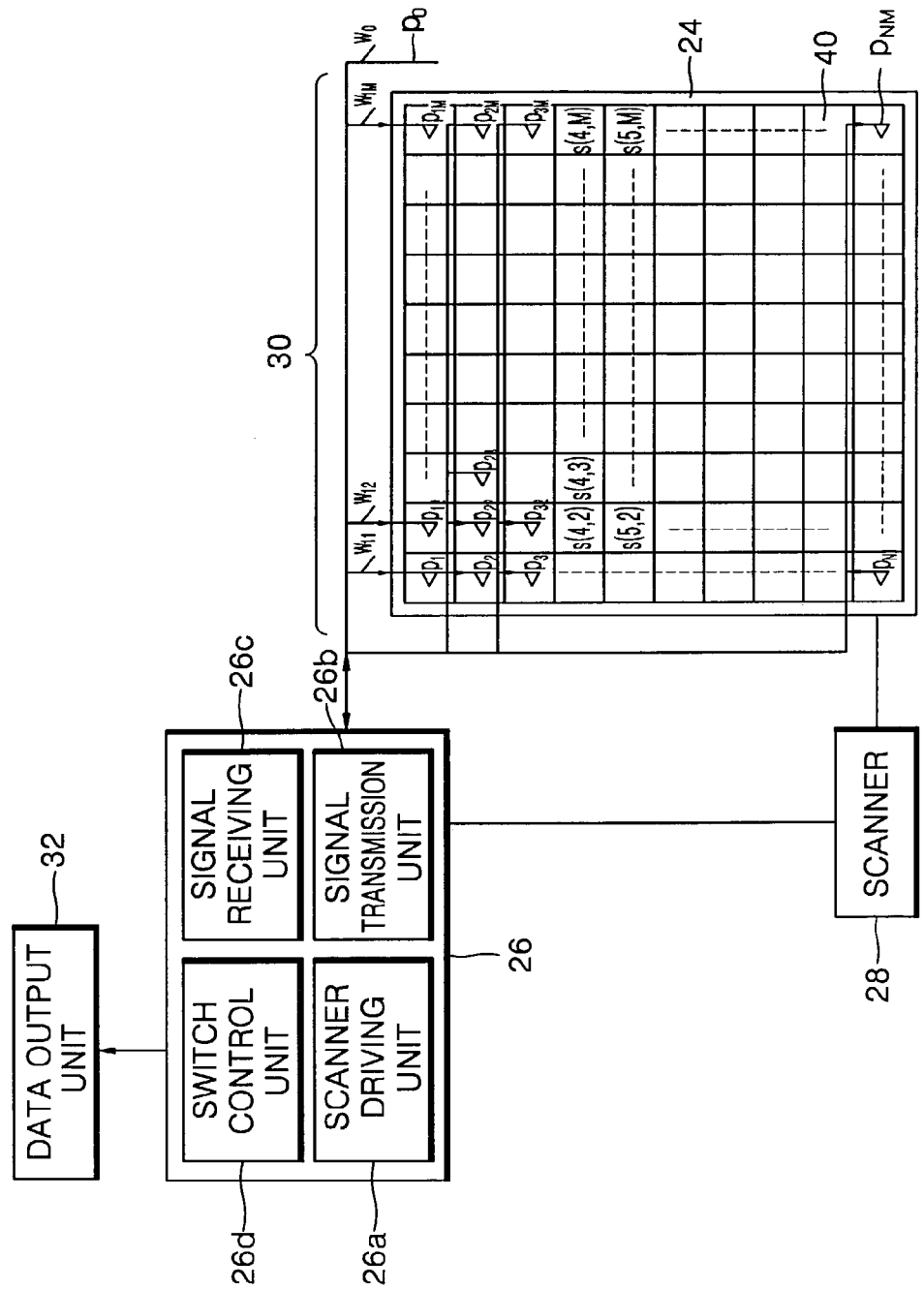
FIG. 4A is a block diagram briefly showing the configuration of a data storage apparatus according to the first embodiment of the present invention.

Referring to FIG. 4A, a recording medium 40 has an area S divided into a plurality of data storage areas. A cantilever array 30 includes a plurality of cantilevers P for recording and reproducing data while moving at an equal speed over the data storage area S. A stage 24 supports the cantilever array 30. A scanner 28 drives the stage 24. A controller 26 applies a driving signal for driving the scanner 28, a voltage signal for data recording, and a modulation signal for data reproduction to the cantilever array 30, and detects a current signal generated due to the interaction between the recording medium 40 and the cantilevers P. Switches $w_{11}$, $w_{12}$, ..., and $w_{NM}$ connect the controller 26 to the cantilevers $p_{11}$, $p_{12}$, ..., and $p_{NM}$.

The controller 26 is also connected to a data output unit 32 for outputting data from the detected current signal for data reproduction.

The cantilever array 30 is divided into a no-tip cantilever $p_0$ and cantilevers $p_{11}, p_{12}, \ldots,$ and $p_{NM}$ each having a tip. The cantilevers $p_{11}, p_{12}, \ldots,$ and $p_{NM}$ form a capacitor with an electrode (not shown) placed under the cantilevers $p_{11}, p_{12}, \ldots,$ and $p_{NM}$. The no-tip cantilever $p_0$ forms a pseudo-differential capacitor to serve as a reference capacitor, in cooperation with an electrode (not shown) placed under the no-tip cantilever $p_0$. The reference capacitor eliminates the nominal capacitance formed by each of the cantilevers $p_{11}, p_{12}, \ldots,$ and $p_{NM}$. Instead of a no-tip cantilever $p_0$ and an electrode, a general capacitor can be used as a reference capacitor.

The recording medium 40 is divided into N×M equal data areas so that one data region is designated to each of the cantilevers $p_{11}, p_{12}, \ldots,$ and $p_{NM}$. A data area s(1,1) is designated to the cantilever $p_{11}$, and a data area s(1,2) is designated to the cantilever $p_{12}$. In this manner, finally, a data area s(N,N) is designated to the cantilever $p_{NM}$. The cantilevers $p_{11}, p_{12}, \ldots,$ and $p_{NM}$ record and reproduce data while moving within their respective designated data areas, and cannot record and reproduce data by moving over the areas other than the designated data areas.

The controller 26 includes a scanner driving unit 26a, a signal transmission unit 26b, a signal receiving unit 26c, and a switch control unit 26d. The scanner driving unit 26a outputs a signal for driving the scanner 28 in order to move the stage 24. The signal transmission unit 26b sequentially transmits a voltage signal for data recording to the recording medium 40 by the cantilevers $p_{11}, p_{12}, \ldots,$ and $p_{NM}$, and a voltage modulation signal for data reproduction from the recording medium 40 by the cantilevers $p_{11}, p_{12}, \ldots,$ and $p_{NM}$. The signal receiving unit 26c receives a current signal from the reference capacitor and a current signal generated due to the interaction of the recording medium 40 with the cantilevers $p_{11}, p_{12}, \ldots,$ and $p_{NM}$ to which the voltage modulation signal has been applied. Thereafter, the signal receiving unit 26c receives the current signals to obtain a current signal for data reproduction. The switch control unit 26d simultaneously opens or closes the switches $w_{11}, w_{12}, \ldots,$ and $w_{NM}$.

To be more specific, the scanner driving unit 26a stops driving the scanner 28 when the signal transmission unit 26b applies a voltage signal or a voltage modulation signal to the cantilever array 30 and the cantilever array 30 records or reproduces data to the recording medium 40, and then re-drives the scanner 28. The scanner driving unit 26a can move the cantilever array 30 to a place over the surface of the recording medium 40 by driving the cantilever array 30 instead of driving the stage 24.

The signal receiving unit 26c can detect a data reproduction signal in the form of a difference current signal between the reference capacitor and the capacitor formed by the cantilevers $p_{11}, p_{12}, \ldots,$ and $p_{NM}$ subject to the interaction of the recording medium 40 according to the voltage modulation signal applied to the cantilevers $p_{11}, p_{12}, \ldots,$ and $p_{NM}$ by the signal transmission unit 26b.

The switch control unit 26d records or reproduces data by simultaneously opening or closing the switches $w_{11}, w_{12}, \ldots,$ and $w_{NM}$.

Figure 4B:
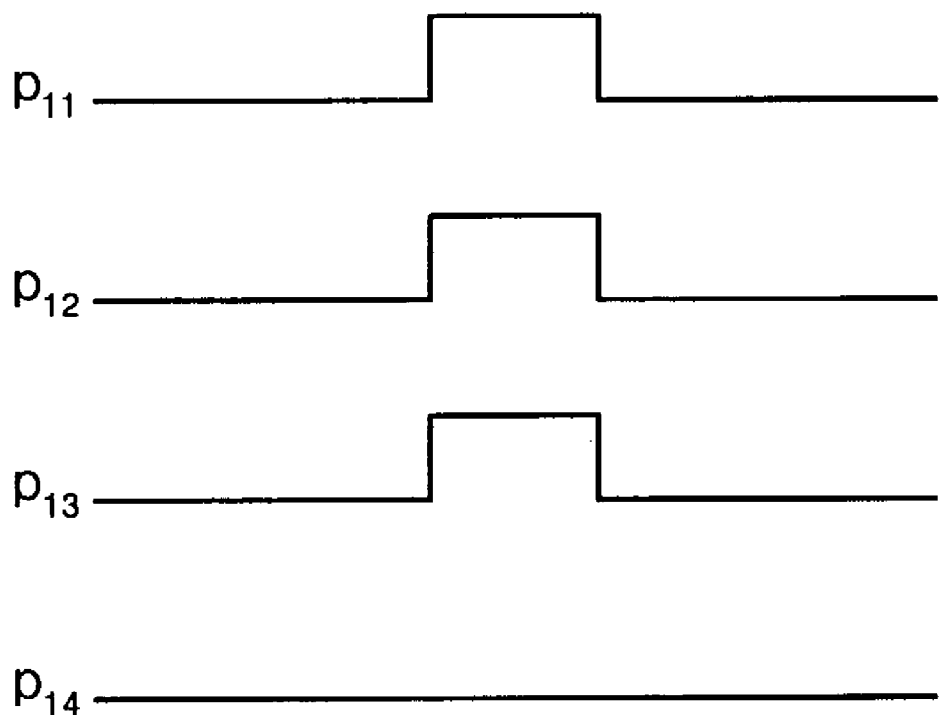
FIG. 4B is a graph briefly showing voltage signals for data recording, which are applied to the cantilevers of the data storage apparatus of FIG. 4A.

A data recording method performed in the data storage apparatus of FIG. 4A will now be described with reference to FIG. 4B. In the data recording method, while the scanner driving unit 26a moves the stage 24 in the X- and Y-axis directions by applying a signal for driving the scanner 28, a voltage signal for data recording is applied by the signal transmission unit 26b. At this moment, the scanner 28 stops, and the switches $w_{11}, w_{12}, \ldots,$ and $w_{NM}$ connected to the cantilevers $p_{11}, p_{12}, \ldots,$ and $p_{NM}$ selectively open or close to apply a voltage signal to only desired cantilevers. In this way, data is recorded.

If a voltage signal for recording data to only the cantilevers $p_{11}, p_{12}$ and $p_{13}$ is applied, only the switches $w_{11}, w_{12}$ and $w_{13}$ connected to the cantilevers $p_{11}, p_{12}$ and $p_{13}$ are closed. Thus, as shown in FIG. 4B, the voltage signal is applied to the cantilevers $p_{11}, p_{12}$ and $p_{13}$, while the switches connected to the other cantilevers including the cantilever $p_{14}$ are opened to prevent the voltage signal from being applied to these cantilevers.

Here, since all data are recorded equidistantly like a conventional data storage apparatus, the offset between data is 0.

A data reproduction method performed in the data storage apparatus of FIG. 4A will now be described with reference to FIG. 4C(a) and (b).

Figure 4C:
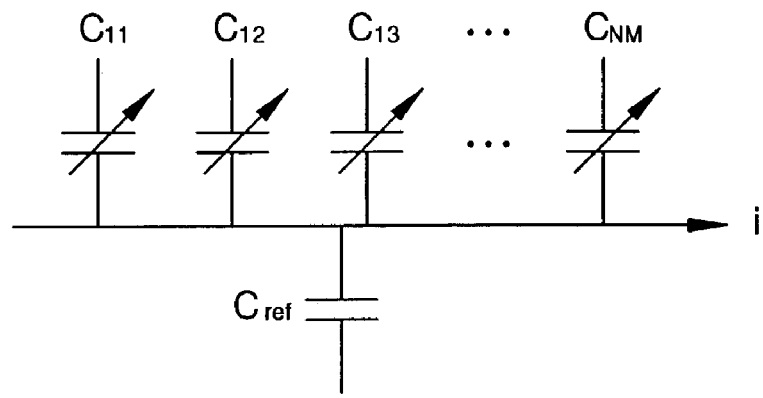
FIG. 4C(a) is a circuit diagram briefly showing an equivalent circuit of a reference capacitor and each of the cantilevers of the data storage apparatus of FIG. 4A.
Figure 4C:
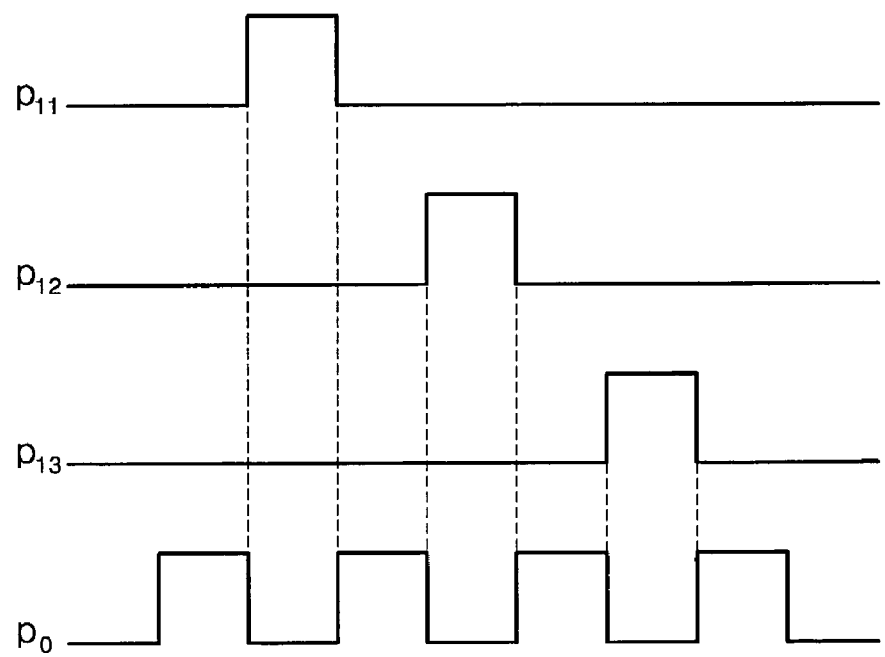

FIG. 4C(a) is a circuit diagram briefly showing an equivalent circuit of the no-tip cantilever $p_0$, that is, a reference capacitor, and the cantilevers $P_{11}, p_{12},$ and $p_{NM}$. Referring to FIG. 4C(a), the no-tip cantilever $P_0$ of FIG. 4A serves as a capacitor having a reference capacitance $C_{ref}$ in cooperation with an electrode, and the plurality of cantilevers $p_{11}, p_{12}, \ldots,$ and $p_{NM}$ having tips serve as capacitors having capacitances $C_{11}, C_{12}, \ldots,$ and $C_{NM}$ in cooperation with an electrode.

In order to share the reference capacitance $C_{ref}$, the reference capacitance must be detected by time division multiplexing as shown in FIG. 4C(b).

FIG. 4C(b) is a graph showing voltage modulation signals sequentially applied to the cantilevers $p_{11}, p_{12}, \ldots,$ and $p_{NM}$ having tips and the no-tip cantilever $p_0$ at time intervals.

Data can be reproduced from the recording medium 40 from the current from the capacitances $C_p$ detected from the plurality of cantilevers $p_{11}, p_{12}, \ldots,$ and $p_{NM}$ having tips and a reference capacitance $C_{ref}$ of the no-tip cantilever $p_0$, which form Equation 4:

$$I = C_P \frac{dV_m}{dt} + C_{ref} \frac{d(-V_m)}{dt} = (C_0 + \Delta C) \frac{dV_m}{dt} + C_0 \frac{d(-V_m)}{dt} = \Delta C \frac{dV_m}{dt} \quad (4)$$

Figure 5:
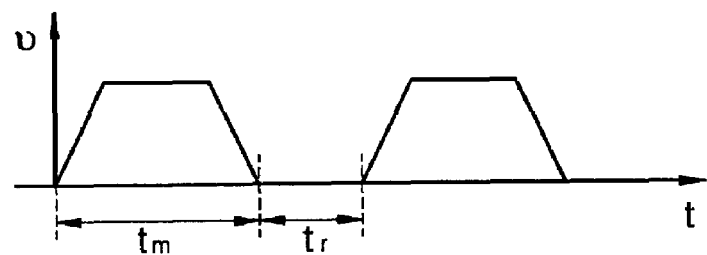
FIG. 5 is a graph showing a variation in the driving speed of a scanner with respect to the scanning time of the scanner in the data storage apparatus according to the first embodiment of the present invention.

FIG. 5 is a graph showing a variation in the driving speed of a scanner with respect to the scanning time of the scanner in the data storage apparatus according to the first embodiment of the present invention. As shown in FIG. 5, in the duration $t_r$ for reproduction, the scanner stops, and accordingly the speed v is zero. In the duration $t_m$ for moving, the scanner must stop at an increasing speed, moves at an equal speed, and then moves at a decreasing speed to stop.

In the Second Embodiment

In a data storage apparatus according to the second embodiment of the present invention, and the data recording method and data reproducing method using this data storage apparatus, data is recorded and reproduced while a scanner moves at an equal speed, and a pseudo-differential capacitor is used upon reproduction.

Unlike the first embodiment, in the data storage apparatus according to the second embodiment of the present invention, data is recorded and reproduced while the scanner moves at an equal speed without repeating stopping and moving. Thus, the data storage apparatus according to the second embodiment achieves faster data recording and reproduction than the first embodiment.

Figure 6A:
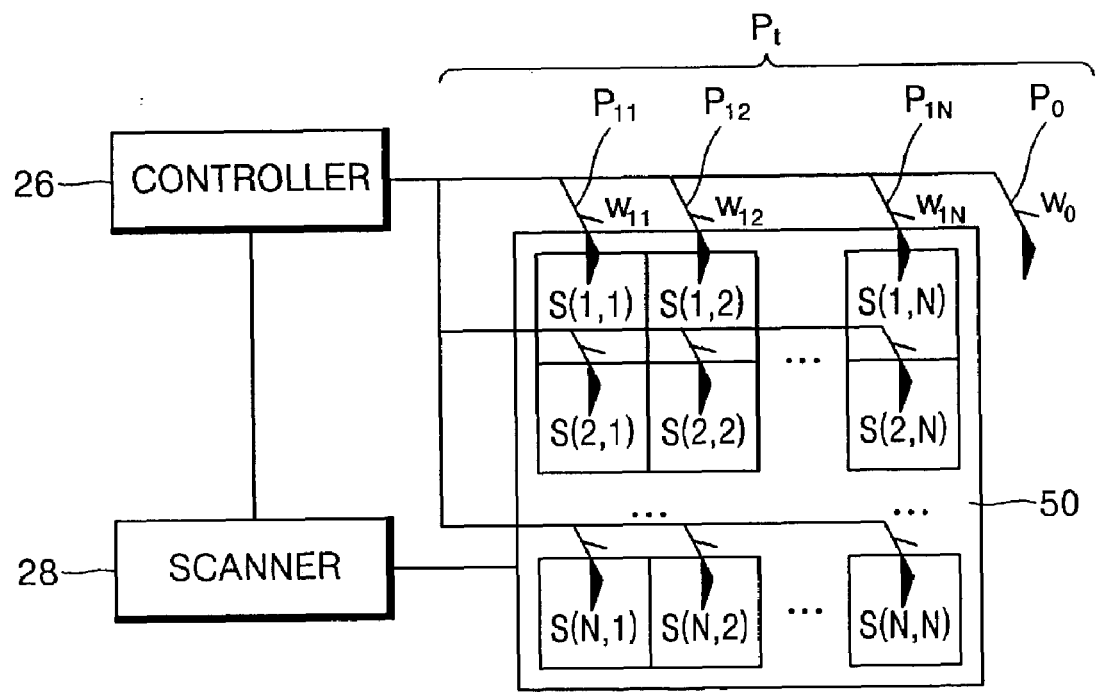
FIG. 6A is a block diagram of a data storage apparatus with N×N cantilevers, according to the second embodiment of the present invention.

As shown in FIG. 6A, the data storage apparatus according to the second embodiment of the present invention includes a cantilever array $P_t$ having N×N cantilevers, and a recording medium 50, whose data area is divided into as many areas as the number of cantilevers, that is, into N×N parts.

The cantilever array $P_t$ has N×N cantilevers $P_1$, $P_{12}$, ..., and $P_{NN}$, and the recording medium 50 is composed of N×N data areas S(1,1), S(1,2), ..., and S(N,N), which are covered by the cantilevers $P_{11}$, $P_{12}$, ..., and $P_{NN}$, respectively. The cantilever array $P_t$ according to the second embodiment can further include a reference cantilever $P_0$ or a reference capacitor instead of the reference cantilever $P_0$.

The remaining elements of the data storage apparatus according to the second embodiment are the same as those of the first embodiment of FIG. 5A except that the scanner driving unit in the controller 26 generates a driving signal for moving the scanner 28 at an equal speed without generating a driving signal for stopping the scanner 28.

In order to record data to some desired data areas of a recording medium, the switch control unit 26d of the controller 26 sequentially applies a switching signal to switches $w_{11}$, $w_{12}$, ..., and $w_{NN}$ so that a voltage signal for data recording is applied to only the cantilevers corresponding to the desired data areas.

Such a switching manner upon data recording according to the second embodiment is based on the time division multiplexing technique, in contrast with the simultaneous switching of the switch control unit 26d according to the first embodiment upon data recording.

A data recording method performed in the data storage apparatus according to the second embodiment of the present invention will now be described with reference to FIG. 6B.

Figure 6B:
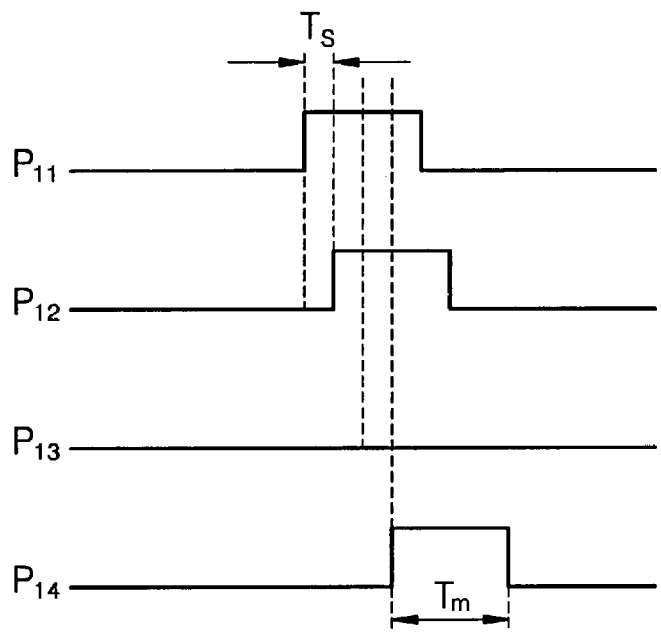
FIG. 6B is a graph briefly showing the data recording signals of the data storage apparatus according to the second embodiment of the present invention.

Referring to FIG. 6B, the voltage signal for data recording is applied to the cantilever $P_{11}$ by closing the switch $w_{11}$ connected to the cantilever $P_{11}$. After the duration $T_s$, another voltage signal for data recording is applied to the cantilever $P_{12}$ by closing the switch $w_{12}$ connected to the cantilever $P_{12}$. After another duration $T_s$, the cantilever $P_{13}$ is not subject to the voltage signal for data recording by opening the switch $w_{13}$ connected to the cantilever $P_{13}$. After still another duration $T_s$, the cantilever $P_{13}$ is subject to the voltage signal for data recording by closing the switch $w_{14}$ connected to the cantilever $P_{14}$. Through this sequential switching, the voltage signal for data recording is sequentially applied to the cantilevers $P_{11}$ through $P_{NN}$.

Through this sequential application of the voltage signal for data recording, the cantilevers $P_{11}$, $P_{12}$, ..., and $P_{NN}$ sequentially record data to the respective data areas S(1,1), S(1,2), ..., and S(N,N) of the recording medium 50.

The time shift for recording data is indicated by $T_s$, the duration for applying a signal is indicated by $T_m$, and the interval between data recorded by the uniform movement of a stage is indicated by a uniform interval (ΔL) given by Equation 1.

If the interval (L) between the first and the second data in the area S(1,1) is given as 100 nm and the moving speed (v) of a scanner is given 2 mm/s, the first and the second data are recorded to the area S(1,1) at a time space ($t_s$) of 50 μs.

Data is recorded to the data areas in the sequence of S(1,1), S(1,2), S(1,3), S(1,N), S(2,1), S(2,2), ..., and S(N,N).

When a voltage signal is applied to each of the cantilevers $P_{11}$, $P_{12}$, ..., and $P_{NN}$, data is recorded to the data areas in the sequence of S(1,1), S(1,2), ..., and S(N,N), as described above. Recorded data are isolated from one another at the interval (ΔL) given by Equation 1 with respect to the driving speed v of a stage.

The offset $L_{N,N}$ of the recorded data at the area S(N,N) with respect to that of the data at the area S(1,1) can be derived as Equation 5 from Equation 1 since it is recorded after the $(N^2-1)$th data recording. Equation 5 is:

$$L_{N,N} = L\frac{N^2-1}{N^2} \quad (5)$$

With reference to Equation 5, the offset $L_{1,n}$ between the centre of the data in the area S(1,1) and that of the data in the area S(1,n) is expressed as in Equation 6:

$$L_{1,N} = L\frac{n-1}{N^2} \quad (6)$$

The time from when a cantilever starts to record to when the next cantilever starts to record can be calculated using Equation 7:

$$t_d = L/VN^2 \quad (7)$$

Figure 7:
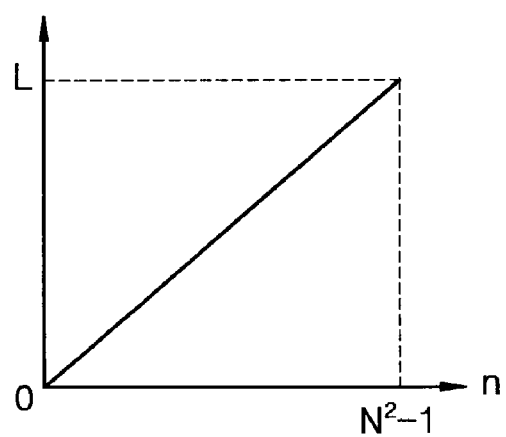
FIG. 7 is a graph showing the intervals between data depending on the sequence of data recording by the data storage apparatus according to the second embodiment of the present invention.

FIG. 7 is a graph showing the offset between the center of the data in the area S(1,1) and that of the data in the area S(N,N) in the data storage apparatus according to the second embodiment of the present invention. The center of the data recorded in the area S(1,1) is expressed as 0 in X-axis of FIG. 7, and the center of the data recorded in the area S(N,N) is expressed as $N^2-1$ because the data in the (N×N)th data area is the $(N^2-1)$th recorded data from the (1×1)th data area. The data interval $L_{N,N}$ is the same as shown in Equation 5. Accordingly, the data interval corresponding to the value $N^2-1$ in FIG. 7 is L.

Note that the offset between data recorded at any of the two areas by a conventional data storage apparatus is zero.

Figure 8A:
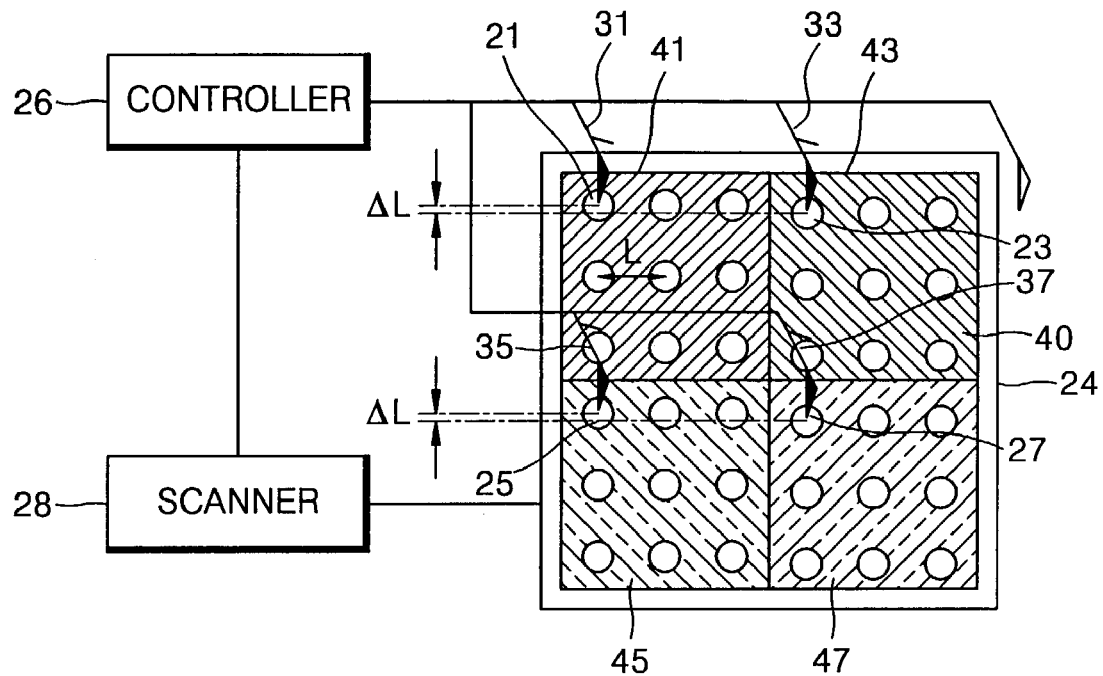
FIG. 8A briefly shows the data storage apparatus with 2×2 cantilevers according to the second embodiment of the present invention, and a data recording method using the apparatus.

FIG. 8A briefly shows a conceptual data storage apparatus with 2×2 cantilevers according to the second embodiment of the present invention and illustrates the data recording method. Referring to FIG. 8A, the recording medium 40 is divided into 2×2 data areas 41, 43, 45 and 47 to be designated to cantilevers 31, 33, 35 and 37, respectively. Although each of the data areas 41, 43, 45 and 47 has a lot of data, FIG. 8A shows only 9 data. The first cantilever 31 can record data to and reproduce data from the first data area 41, and cannot record data to and reproduce data from the second through the fourth data areas 43, 45 and 47 to which the second through the fourth cantilevers 33, 35 and 37 are designated. Upon data recording, the cantilevers 31, 33, 35 and 37 are not simultaneously driven, and a switch is opened or closed depending on the type of data recording sequences every time a scanner moves the unit distance ΔL shown in Equation 1 while moving at a uniform speed. Thus, a voltage is applied, so that data is recorded on each of the data areas.

If the distance between data is L, the offset ΔL between the first data 21 for the first data area 41 and the secondly-recorded data 23 for the data area 43 is L/4. The offset between recorded data is equally applied to the interval between the secondly-recorded data 23 and thirdly recorded data 25 and the offset between the thirdly recorded data 25 and fourthly recorded data 27.

The second cantilever 33 records the data 23 as its first data to the second data area 43, and then the third cantilever 35 records the data 25 as its first data to the third data area 45.

Thereafter, the fourth cantilever 37 records the data 27 as its first data to the fourth data area 47. After the respective first data are recorded to the four data areas, the first cantilever also records second data to the first data area 41. Similarly, the second through fourth cantilevers 33, 35 and 37 also sequentially record their respective second data to their respective data areas.

Figure 8B:
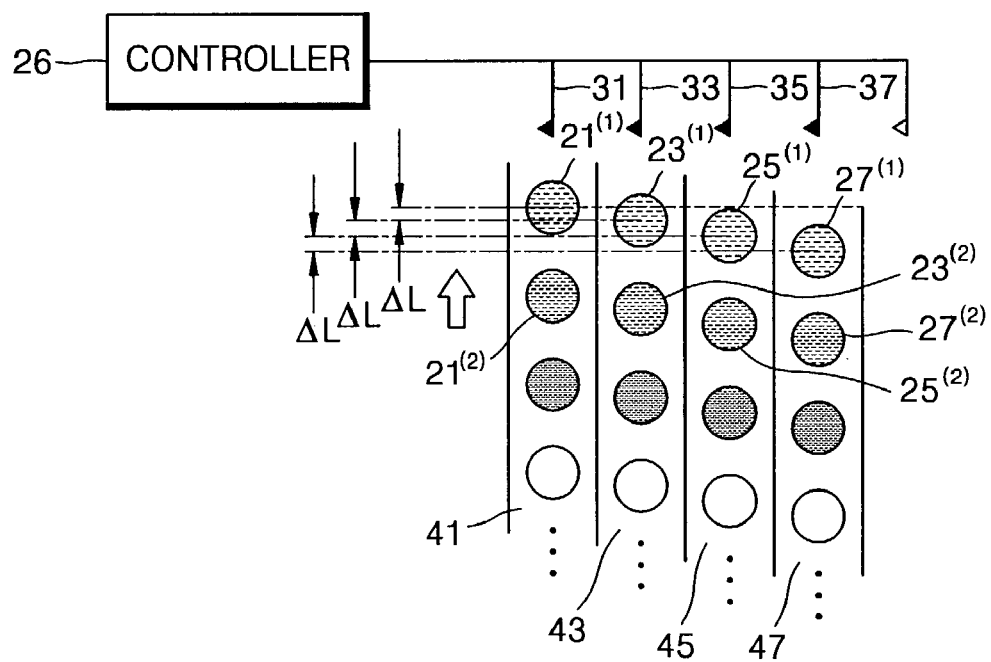
FIG. 8B briefly illustrates a data recording method depending on the sequence of recording by the data storage apparatus of FIG. 8A.

FIG. 8B is a conceptual diagram illustrating a data recording method described in the data storage apparatus of FIG. 8A. In FIG. 8B, as shown in FIG. 8A, the first through the fourth cantilevers 31, 33, 35 and 37 are connected to the controller 26. The data are arranged in the sequence of data recorded to the first through the fourth data areas 41, 43, 45 and 47, which are designated to the first through the fourth cantilevers 31, 33, 35 and 37, respectively. For convenience of explanation, only four recorded data for each of the data areas 41, 43, 45 and 47 are shown.

In the data storage apparatus, the controller 26 applies a recording signal to the first through the fourth cantilevers 31, 33, 35 and 37 at time intervals $t_d$ of L/4V. Since a scanner is driven in the direction indicated by arrow ⇑, data is recorded at uniform offsets of $\Delta L$ while moving in the opposite direction to the moving direction of a stage.

First of all, the first cantilever 31 records the first data $21^{(1)}$ to the first data area 41. After a time $t_d$, the second cantilever 33 records the first data $23^{(1)}$ to the second data area 43. After another time $t_d$, the third cantilever 35 records the first data $25^{(1)}$ to the third data area 45. After still another time $t_d$, the fourth cantilever 37 records first data $27^{(1)}$ to the fourth data area 47. After all of the cantilevers 41, 43, 45 and 47 have the first data $21^{(1)}, 23^{(1)}, 25^{(1)}$ and $27^{(1)}$, respectively, second data $21^{(2)}, 23^{(2)}, 25^{(2)}$ and $27^{(2)}$ are sequentially recorded to the cantilevers 41, 43, 45 and 47, respectively.

To be more specific, when the controller 26 applies a voltage level to the first cantilever 31, the second data $21^{(2)}$ is recorded to the first data area 41. After a time $t_d$, the second cantilever 33 is subject to the voltage signal and then records the second data $23^{(2)}$ to the second data area 43. Similarly, the third cantilever 35 records the second data $25^{(2)}$ after another time $t_d$, and the fourth cantilever 37 records the second data $27^{(2)}$ after still another time $t_d$.

In such a manner, the third data $21^{(3)}, 23^{(3)}, 25^{(3)}$ and $27^{(3)}$ are sequentially recorded, and, finally, the last data $21^{(9)}, 23^{(9)}, 25^{(9)}$ and $27^{(9)}$ are recorded.

Data reproduction by the data storage apparatus according to the second embodiment of the present invention is performed in the same manner as the data reproduction according to the first embodiment, except that voltage modulation signals are sequentially applied while a scanner moves at a uniform speed, instead that voltage modulation signals are sequentially applied when a scanner stops.

Referring to FIG. 4C, voltage modulation signals are sequentially applied to the cantilevers $p_{11}, p_{12}, \ldots,$ and $p_{NM}$ of a data storage apparatus having an equivalent circuit. A current signal is generated from both the capacitor formed by the cantilevers $p_{11}, p_{12}, \ldots,$ and $p_{NM}$ which are subject to the interaction with recording medium and the reference capacitor as shown in Equation 4. Accordingly, data can be reproduced. Here, the time interval $t_s$ between the voltage modulation signals applied can be calculated by Equation 8:

$$t_s = \frac{L}{VNM} \tag{8}$$

In the Third Embodiment

In a data storage apparatus according to the third embodiment of the present invention, a scanner records data while moving at a uniform speed, and a pseudo-differential capacitor is not adopted.

Figure 9A:
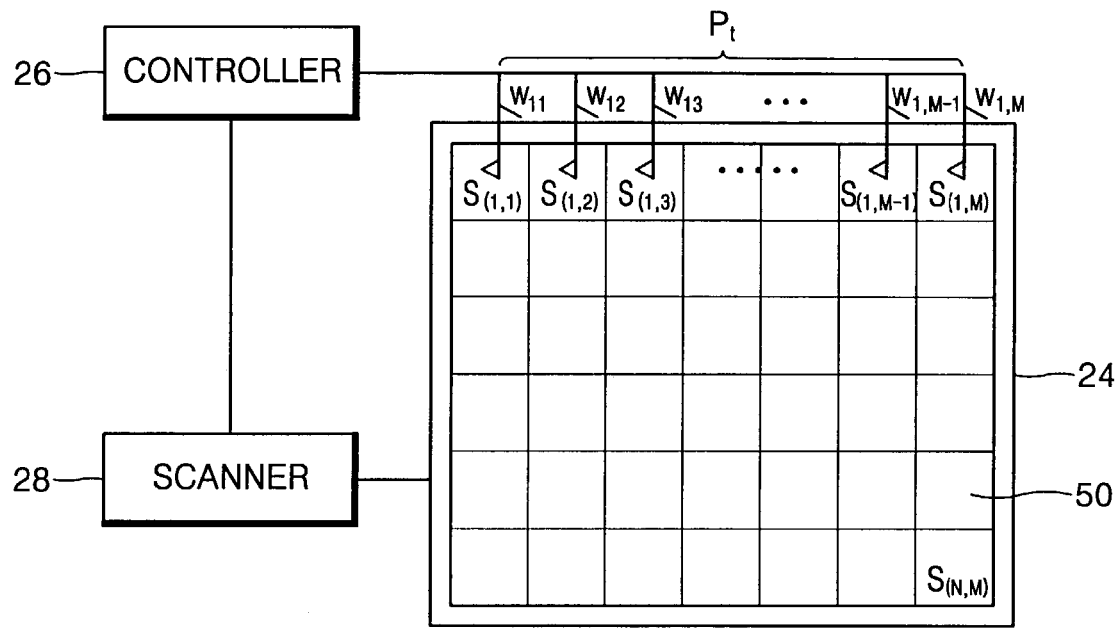
FIG. 9A is a block diagram briefly showing the configuration of a data storage apparatus according to the third embodiment of the present invention.

FIG. 9A is a block diagram briefly showing the structure of a data storage apparatus according to the third embodiment of the present invention. Referring to FIG. 9A, a recording medium 50 is composed of a plurality of data areas, and includes a cantilever array of a plurality of cantilevers. A stage 24 supports the recording medium 50. A scanner 28 drives the stage 24. A controller 26 applies a scanner driving signal to the scanner 28, applies a voltage signal for data recording to the cantilevers, and detects a data reproduction signal from the interaction of the recording medium 50 with the cantilevers.

The data storage apparatus according to the third embodiment of the present invention is the same as that according to the second embodiment in terms of elements' names and functions, except that it does not include a pseudo-differential capacitor for forming a reference capacitance and that it uses cantilevers configured such that the data recorded by various quantities, such as charge amounts, electric polarization, magnetic polarization, geometrical shapes, and phase changes can be detected in their respective appropriate manners.

Accordingly, the second and the third embodiments of the present invention are similar in terms of a data recording method, but different in terms of a data reproduction method.

Figure 9B:
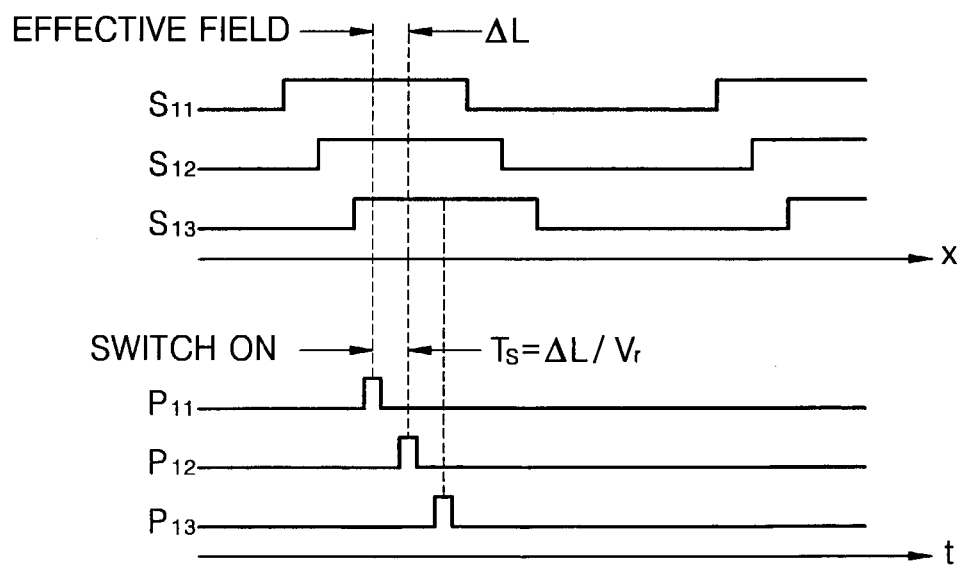
FIG. 9B is a graph briefly showing the data reproduction signals of the data storage apparatus according to the third embodiment of the present invention.

The data reproduction method according to the third embodiment of the present invention will now be described with reference to FIG. 9B. Referring to FIG. 9B, each of the cantilevers $P_{11}, P_{12}, \ldots,$ and $p_{NM}$ detects a signal by opening or closing the switches $w_{11}, w_{12}, \ldots,$ and $w_{NM}$ in the middle of the effective field of each of each data area. If the offset between data is $\Delta L$, the time interval $\Delta t$ at which a signal is detected is the same as shown in Equation 3.

Because a single controller controls a plurality of cantilevers, a data storage apparatus according to the present invention can be driven with a small amount of power, and its chip area can be diminished.

In the present invention, the use of a pseudo-differential capacitor can compensate for the disadvantage of the prior art adopting a differential capacitor that the driving range of a scanner increases with an increase in the data area allocated to each cantilever due to the bulkiness of the differential capacitor. The pseudo-differential capacitor can serve as a reference capacitor applied to a plurality of cantilevers, thus making it easier to control the cantilevers.

In addition, the uniform speed operation of a scanner makes fast data recording possible because it does not need accelerating, moving, and stopping of the scanner. Since data are transferred at predetermined time intervals upon data detection, signal interpretation in a single detection circuit is possible. This makes fast data reproduction possible because accelerating, moving, and stopping of the scanner are not needed.

While this invention has been particularly shown and described with reference to preferred embodiments thereof, it will be understood by those skilled in the art that various changes in form and details may be made therein without departing from the spirit and scope of the invention as defined by the appended claims.

As described above, in the data storage apparatus according to the present invention and a data recording and reproducing method adopting the data storage apparatus, a signal can be accurately detected by providing a plurality of cantilevers, and control of the plural cantilevers by a single controller the apparatus requires a small amount of power and ensures easy control. The use of a pseudo-differential capacitor can reduce the size of a data storage apparatus. Since data can be recorded and reproduced in a data detection sequence by moving a scanner at a uniform speed, data can be rapidly recorded and reproduced with high density.

What is claimed is:

1. A data storage apparatus comprising:
a recording medium for storing data;
a cantilever array of a plurality of cantilevers for recording data to and reproducing data from the recording medium in a data detecting sequence;
a stage for supporting the recording medium;
a scanner for driving the stage;
a controller for applying a scanner driving signal to the scanner and applying a voltage signal for data recording or a voltage modulation signal for data reproduction to the plurality of cantilevers, in order to detect data; and
a reference capacitor for eliminating the normal capacitance formed by each of the cantilevers, wherein the reference capacitor is formed by a no-tip cantilever and an electrode.

2. A data recording method performed in a data storage apparatus including a recording medium, a cantilever array of a plurality of cantilevers for recording data to and reproducing data from the recording medium, a stage for supporting the recording medium, a scanner for driving the stage, a controller for applying a scanner driving signal to the scanner and applying a voltage signal for data recording to the plurality of cantilevers, and switches for connecting the plurality of cantilevers to the controller, the data recording method comprising:
dividing the recording medium into an equal number of data areas to the number of cantilevers so that each of the data areas is allocated to one of the cantilevers;
moving the scanner at a uniform speed;
applying the voltage signal for data recording to the cantilevers; and
recording data by sequentially opening or closing the switches connected to the cantilevers allocated to the data areas of the recording medium,
wherein, when the number of cantilevers is N×M and the interval between data is L, the cantilevers record data at offsets of ΔL satisfying the equation:

$$\Delta L = \frac{L}{NM}.$$

3. A data reproduction method performed in a data storage apparatus including a recording medium, a cantilever array of a plurality of cantilevers for recording data to and reproducing data from the recording medium, a stage for supporting the recording medium, a scanner for driving the stage, a controller for applying a scanner driving signal to the scanner and applying a voltage modulation signal for data reproduction to the plurality of cantilevers, and a reference capacitor for providing a reference voltage signal to eliminate a nominal capacitance formed by each of the cantilevers, the data reproduction method comprising:
dividing the recording medium into a number of equal data areas corresponding to the number of cantilevers so that each of the data areas is allocated to one of the cantilevers;
moving the scanner at a uniform speed;
sequentially applying the voltage modulation signal for data reproduction to the cantilevers; and
reproducing data by differentiating a current signal generated from the reference voltage signal from a current signal from the capacitors formed by the cantilevers, to which the voltage modulation signal is applied, subject to the interaction with the recording medium,
wherein, when the number of cantilevers is N×M, the interval between data is L, and the speed of the scanner is V, the cantilevers reproduce data at intervals of Δt satisfying the equation:

$$\Delta t = \frac{L}{VNM}.$$

4. A data reproduction method performed in a data storage apparatus including a recording medium, a cantilever array of a plurality of cantilevers for recording data to and reproducing data from the recording medium, a stage for supporting the recording medium, a scanner for driving the stage, a controller for applying a scanner driving signal to the scanner and applying a voltage modulation signal for data reproduction to the plurality of cantilevers, and a plurality of switches for connecting the plurality of cantilevers to the controller, the data reproduction method comprising:
dividing the recording medium into a number of equal data areas corresponding to the number of cantilevers so that each of the data areas is allocated to one of the cantilevers;
moving the scanner at a uniform speed;
opening or closing the switches connected to the cantilevers when one or more of the cantilevers are within effective fields of the data areas; and
detecting a current signal generated by the interaction of the cantilevers with the recording medium, to reproduce data;
wherein the number of cantilevers is N×M and the interval between data is L and wherein the cantilevers record data at offsets of ΔL satisfying the equation:

$$\Delta L = \frac{L}{NM}.$$

5. A data storage apparatus comprising:
a recording medium for storing data;
a cantilever array of a plurality of cantilevers for recording data to and reproducing data from the recording medium in a preset sequence;
a stage for supporting the recording medium;
a scanner for driving the stage at a uniform speed; and
a controller for applying a scanner driving signal to the scanner and applying a voltage signal for data recording or a voltage modulation signal for data reproduction to the plurality of cantilevers;
wherein the number of cantilever is N×M and the interval between data is L and wherein the cantilevers record data at offsets of ΔL satisfying the equation:

$$\Delta L = \frac{L}{NM}.$$

6. A data storage apparatus as recited in claim 5, further comprising:

a reference capacitor for providing a reference voltage signal that is shared by the cantilevers via time division multiplexing to eliminate a nominal capacitance formed by each of the cantilevers.

7. A data storage apparatus as recited in claim 6, wherein the reference capacitor includes a no-tip cantilever and an electrode.

8. A data storage apparatus as recited in claim 6, wherein the controller comprises:

a scanner driving unit for applying the scanner driving signal to the scanner;

a signal transmission unit for applying the voltage signal for data recording or the voltage modulation signal for data reproduction to the cantilevers; and a signal receiving unit for receiving a differenced current signal from capacitors formed by the cantilevers, to which the voltage modulation signal is applied, subject to interactions with the recording medium and from the reference capacitor.

9. A data storage apparatus as recited in claim 8, further comprising:

a plurality of switches installed between the plurality of cantilevers and the signal transmission unit and operative to apply the voltage signal or voltage modulation signal to the cantilevers.

10. A data storage apparatus as recited in claim 9, wherein the controller further includes a switch control unit for applying a switch driving signal to the switches.

11. A data storage apparatus as recited in claim 10, wherein the switch driving signal includes a signal for sequentially opening or closing the switches.

12. A data storage apparatus as recited in claim 5, further comprising a data output unit for outputting data reproduced by the controller.

* * * * *